United States Patent
Li et al.

(10) Patent No.: US 8,643,963 B2
(45) Date of Patent: Feb. 4, 2014

(54) PERMANENT MAGNET ELECTRIC MOTOR

(75) Inventors: Yue Li, Hong Kong (CN); Mao Xiong Jiang, Shenzhen (CN); Jian Zhao, Shenzhen (CN); Yong Li, Shenzhen (CN); Hai Jun Hua, Shenzhen (CN)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 13/234,733

(22) Filed: Sep. 16, 2011

(65) Prior Publication Data

US 2012/0069460 A1    Mar. 22, 2012

(30) Foreign Application Priority Data

Sep. 17, 2010    (CN) .......................... 2010 1 0287466

(51) Int. Cl.
*G02B 7/02*    (2006.01)
(52) U.S. Cl.
USPC ............................ 359/824; 359/822; 359/823

(58) Field of Classification Search
USPC .................................. 359/694, 696, 822–824
See application file for complete search history.

(56) References Cited

U.S. PATENT DOCUMENTS

| | | | | |
|---|---|---|---|---|
| 4,883,996 A | * | 11/1989 | Aoki ........................ | 310/154.24 |
| 2008/0272664 A1 | * | 11/2008 | Flynn ....................... | 310/154.01 |
| 2010/0013361 A1 | * | 1/2010 | Zhao et al. .............. | 310/40 MM |
| 2010/0084941 A1 | * | 4/2010 | Miyajima ................. | 310/198 |
| 2010/0289387 A1 | * | 11/2010 | Tanaka et al. ............. | 310/68 B |
| 2011/0260569 A1 | * | 10/2011 | Liu et al. .................. | 310/158 |

* cited by examiner

*Primary Examiner* — Mahidere Sahle
(74) *Attorney, Agent, or Firm* — Muncy, Geissler, Olds & Lowe, PLLC

(57) ABSTRACT

A permanent magnet electric motor includes a rotor and a stator magnetically coupled to the rotor. The rotor includes a shaft, a rotor core fixed to the shaft and having n teeth, n being an integer, a commutator fixed to the shaft adjacent the rotor core and having m segments, m being an even number less than n. Rotor windings are wound about the teeth and connected to the segments. The stator includes a plurality of permanent magnets surrounding the rotor core and brushes in sliding electrical contact with the commutator.

15 Claims, 2 Drawing Sheets

PERMANENT MAGNET ELECTRIC MOTOR

CROSS REFERENCE TO RELATED APPLICATIONS

This non-provisional patent application claims priority under 35 U.S.C. §119(a) from Patent Application No. 201010287466.6 filed in The People's Republic of China on Sep. 17, 2010.

FIELD OF THE INVENTION

This invention relates to an electric motor and in particular, to a small permanent magnet electric motor for use in an electric apparatus which requires a small and light motor.

BACKGROUND OF THE INVENTION

A typical permanent magnet direct current (PMDC) motor comprises a stator and a rotor rotatable relative to the stator. The stator comprises a housing and a plurality of permanent magnets fixed on the inner surface of the housing. The rotor comprises a shaft, a rotor core fixed to the shaft, a commutator fixed the shaft adjacent the rotor core. The rotor core comprises a plurality of teeth and slots formed between adjacent teeth. Windings are wound on the teeth of the rotor core and connected to segments of the commutator. The stator further comprises brushes in sliding electrical contact with the commutator for transferring electrical power to the windings.

However, in traditional PMDC motors, the number of the commutator segments is equal to that of the rotor slots. The size of the commutator cannot be reduced, which results in a kind of PMDC motor that is not suitable for small electric apparatus with a compact structure.

Hence there is a desire for an improved electric motor with a commutator of reduced size.

SUMMARY OF THE INVENTION

Accordingly, in one aspect thereof, the present invention provides a permanent magnet electric motor comprising: a rotor having a shaft, a rotor core fixed to the shaft and having n teeth, a commutator fixed to the shaft adjacent the rotor core and having m segments, and rotor windings wound about the teeth and connected to the segments; a stator magnetically coupled to the rotor, the stator having a plurality of permanent magnets surrounding the rotor core; and brushes in sliding electrical contact with the commutator; wherein m and n are integers, m being an even number less than n.

Preferably, the commutator comprises 6 segments, the rotor core comprises 9 teeth, and the stator comprises 4 permanent magnets forming 4 magnetic poles.

Preferably, the windings are connected in a triangular configuration and each end of each side of the triangle is respectively connected to two segments.

Preferably, each side of the triangle comprises three windings, said three windings being wound about six of the teeth such that said six teeth form three pairs of adjacent teeth and each winding of said three windings is wound about a respective one of said three pairs of adjacent teeth.

Preferably, diametrically opposed commutator segments are electrically connected together by a respective short circuit wire.

Preferably, the diameter of the commutator is less than 10 mm.

Preferably, the diameter of the commutator is less than 5 mm.

Preferably, the diameter of the commutator is less than 3 mm.

In another aspect thereof, the present invention provides a lens driving device incorporating a motor as described above.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
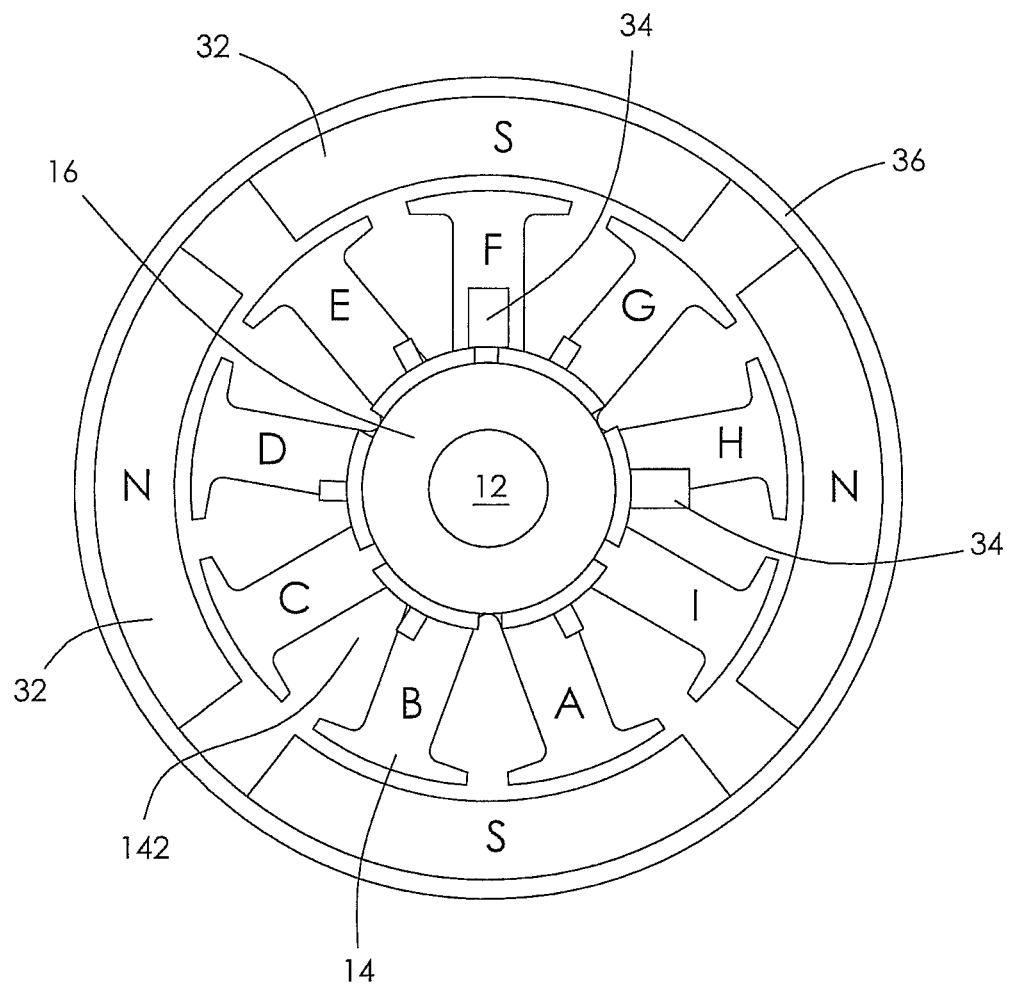
FIG. 1 is a schematic end view of an electric motor according to a preferred embodiment of the present invention.

A permanent magnet electric motor according to a preferred embodiment of the present invention is shown in the figures of the drawings. In FIG. 1 the rotor windings are omitted to simplify the drawing and to show more clearly the structure and shape of the rotor core. As shown in FIG. 1 the motor comprises a rotor and a stator magnetically coupled to the rotor.

The rotor comprises a shaft 12, a rotor core 14 fixed on the shaft 12, and a commutator 16 fixed on the shaft 12 adjacent the rotor core 14. The rotor core 14 is formed by stacking laminations in the axial direction of the rotor. The rotor core 14 has n teeth A~I and there are n rotor windings 18 wound about the teeth A~I. A winding slot 142 is formed between adjacent teeth A~I. The commutator 16 has m segments (also referred to as bars) 161~166. The rotor windings 18 are wound in the winding slots 142 of the rotor core 14 and connected to the segments 161~466 of the commutator 16. Preferably, m is an even number greater than zero, n is an integer and m is less than n.

The stator comprises a plurality of permanent magnets 32 surrounding the rotor core 14 and a pair of brushes 34 configured for slidably contacting with the segments 161~466 of the commutator 16 to thereby feed power to the windings 18. A motor housing 36 forming a part of the stator, supports the magnets.

In this embodiment, n is equal to nine and m is equal to six, and the stator comprises four magnets 32 forming four magnetic poles of the stator.

Figure 2:
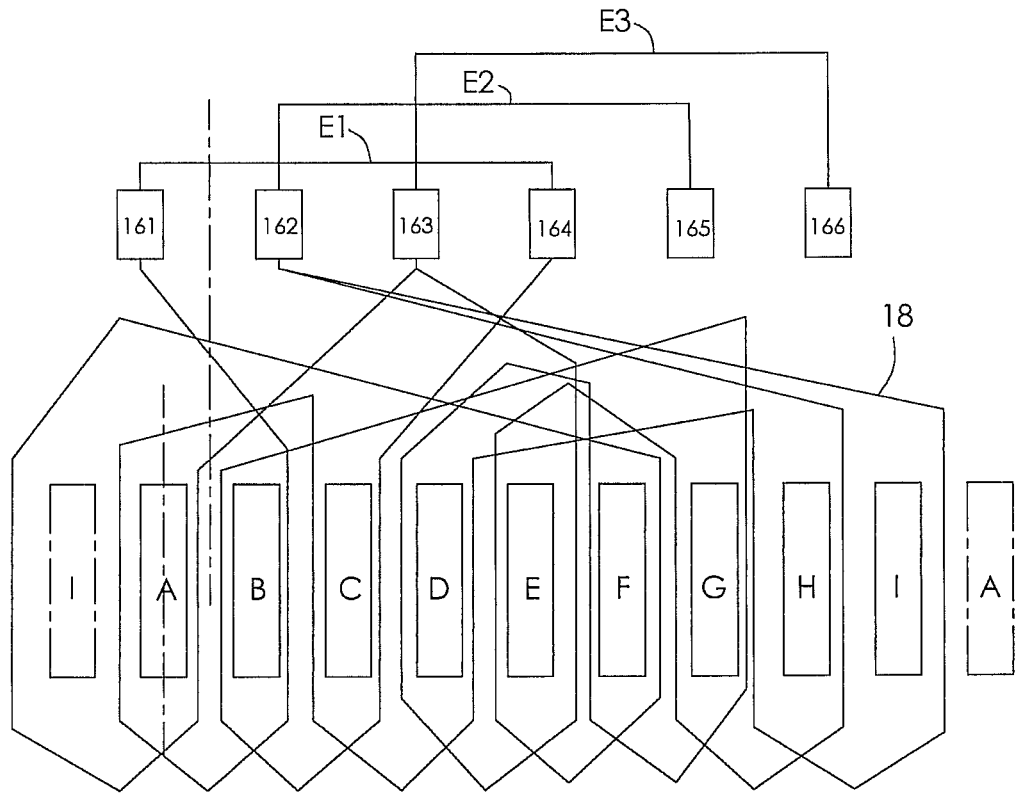
FIG. 2 is a schematic winding pattern diagram for the motor of FIG. 1.
Figure 3:
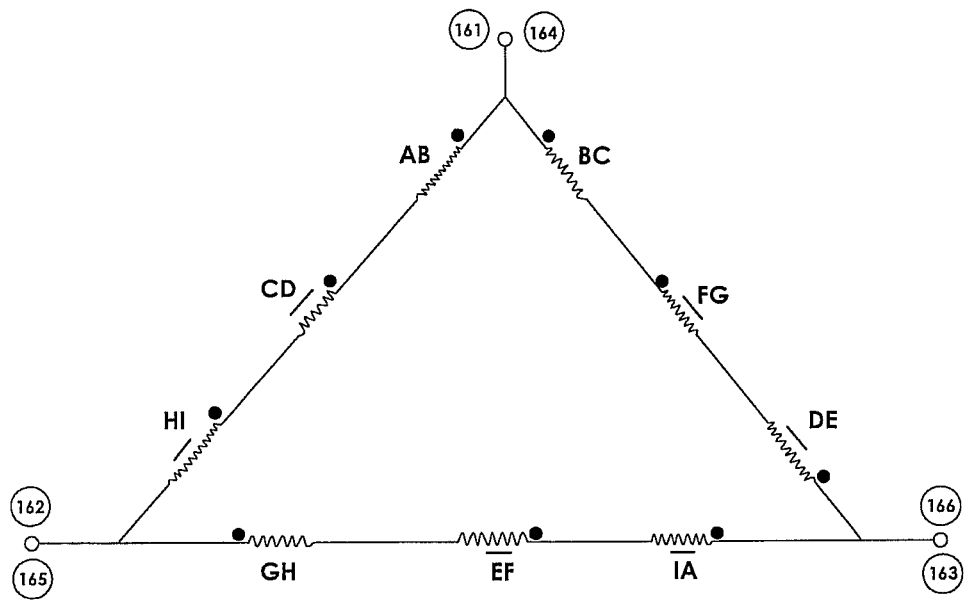
FIG. 3 shows a simplified winding connection diagram for the motor of FIG. 1.

Referring to FIGS. 2 and 3, preferably, the windings 18 are connected in a delta or triangular configuration. Each side of the triangle comprises several windings 18 connected in series and each end of each side are directly connected to two corresponding segments 161~466. Short circuit wires, E1~E3 also known as equalizers, electrically connect together diametrically opposed segments 161-164, 162-165, 163-166.

Preferably, each side of the triangle comprises an equal number of windings 18. In this embodiment, each side of the triangle comprises three windings (AB, CD, HI), (GA, EF, IA) & (DE, FG, BC) connected in series. Each winding 18 is wound around two adjacent teeth. The three windings of each side of the triangle are wound on three pairs of adjacent teeth comprising six different teeth.

Alternatively, two of the three windings 18 may be connected in parallel and then connected with the other in series or two of the three windings 18 may be connected in series and then connected with the other in parallel.

Alternatively, the windings 18 may be connected in a star configuration.

In the present invention, the number of the commutator segments is less than that of the rotor teeth. As such, the motor of the present invention has a commutator with a reduced number of segments which allows the diameter of the commutator to be reduced while keeping a large number of rotor slots to thereby keep a large cogging frequency which equals the least common multiple number of the numbers of stator poles and rotor slots.

The outside or outer diameter of the commutator may be less than 10 mm or even less than 5 mm. Preferably, the outer diameter of the commutator is 3 mm.

The electric motor of the present invention is suitable for lens driving devices such as the auto focus lens for a camera, and other electrical apparatus which require small and light electric motors with high positioning accuracy.

In the description and claims of the present application, each of the verbs "comprise", "include", "contain" and "have", and variations thereof, are used in an inclusive sense, to specify the presence of the stated item but not to exclude the presence of additional items.

Although the invention has been described with reference to one or more preferred embodiments, it should be appreciated by those skilled in the art that various modifications are possible. For example, four brushes 34 may be used and the short circuit wires E1~E3 may be omitted. Therefore, the scope of the invention is to be determined by reference to the claims that follow.

The invention claimed is:

1. A permanent magnet electric motor comprising:
   a rotor having a shaft, a rotor core fixed to the shaft and having nine teeth, a commutator fixed to the shaft adjacent the rotor core and having six segments, and three rotor winding units, each winding unit having two ends directly connected to two respective segments of the commutator and three rotor windings in serial connection between the two ends and wound about the teeth of the rotor core;
   a stator magnetically coupled to the rotor, the stator having four permanent magnetic poles surrounding the rotor core; and
   a plurality of brushes in sliding electrical contact with the commutator for supplying electric current to the rotor windings via the commutator.

2. The motor of claim 1, wherein
   the first of the six segments of the commutator is directly connected to the first end of the first rotor winding unit;
   the second of the six segments of the commutator is directly connected to the second end of the first rotor winding unit and to the first end of the second rotor winding unit;
   the third of the six segments of the commentator is directly connected to the second end of the second rotor winding unit and to the first end of the third rotor winding unit;
   the fourth of the six segments of the commutator is connected to the first segment by a short circuit wire and directly connected to the second end of the third rotor winding units;
   the fifth of the six segments of the commentator is connected to the second segment by a short circuit wire; and
   the sixth of the six segments of the commutator is connected to the third segment by a short circuit wire.

3. The motor of claim 1, wherein two diametrically opposed segments of the commutator are electrically connected together by a respective short circuit wire and the ends of the three rotor winding units are directly connected to four adjacent segments of the commutator.

4. The motor of claim 1, wherein the rotor windings are connected in a triangular configuration and each end of each side of the triangle is connected to two corresponding segments of the commutator.

5. The motor of claim 4, wherein each side of the triangle comprises three windings, said three windings being wound about six of the nine teeth such that said six teeth form three pairs of adjacent teeth and each rotor winding of said three rotor windings is wound about a respective one of said three pairs of adjacent teeth.

6. The motor of claim 1, wherein the three rotor windings of the same winding unit are wound on six different teeth belonging to three adjacent pairs of teeth of the rotor core.

7. The motor of claim 1, wherein the diameter of the commutator is less than 10 mm.

8. The motor of claim 1, wherein the diameter of the commutator is less than 5 mm.

9. The motor of claim 1, wherein the diameter of the commutator is less than 3 mm.

10. A permanent magnet electric motor comprising:
    a rotor having a shaft, a rotor core fixed to the shaft and having n teeth, a commutator fixed to the shaft adjacent the rotor core and having m segments, and a plurality of rotor windings wound about the teeth and coupled to the segments;
    a stator magnetically coupled to the rotor, the stator having k permanent magnetic poles surrounding the rotor core; and
    a plurality of brushes in sliding electrical contact with the commutator for supplying electric current to the plurality of rotor windings via the commutator;
    wherein k, m and n are integers, m is greater than k and less than n, the least common multiple of n and k is greater than 24; and
    wherein the plurality of rotor windings form a plurality of rotor winding units each winding unit having two ends respectively connected to two adjacent segments of the commutator and comprising more than one winding connected in series and wound on different teeth of the rotor core.

11. The motor of claim 10, wherein in and k are even numbers and n is an odd number.

12. The motor of claim 10, wherein the diameter of the commutator is less than 5 mm and m is equal to six.

13. The motor of claim 10, wherein the diameter of the commutator is less than 3 mm and m is equal to six.

14. The motor of claim 10, wherein two diametrically opposed commutator segments are electrically connected together by a respective short circuit wire and the ends of the rotor winding units are directly connected to four adjacent segments of the commutator.

15. The motor of claim 10, wherein at least one of the segments is directly connected to one of the ends of the rotor winding units, at least one of the segments is directly connected to two different ends of two of the rotor winding units, and at least one of the segments is not directly connected to any one of the ends of the rotor winding units.

* * * * *